(12) United States Patent
Bartley

(10) Patent No.: US 6,219,796 B1
(45) Date of Patent: Apr. 17, 2001

(54) POWER REDUCTION FOR PROCESSORS BY SOFTWARE CONTROL OF FUNCTIONAL UNITS

(75) Inventor: David Harold Bartley, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/212,190

(22) Filed: Dec. 15, 1998

Related U.S. Application Data

(60) Provisional application No. 60/068,646, filed on Dec. 23, 1997.

(51) Int. Cl.$^7$ .................................................. G06F 1/32
(52) U.S. Cl. ......................... 713/320; 713/324; 712/214
(58) Field of Search ..................................... 713/320, 322, 713/324, 323, 300; 709/100, 106; 717/5; 710/1, 100; 708/3, 230; 712/208, 233, 214, 36, 200, 245, 41

(56) References Cited

U.S. PATENT DOCUMENTS

| | | |
|---|---|---|
| 3,602,891 * | 8/1971 | Clark . |
| 5,495,617 | 2/1996 | Yamada ............................. 395/750 |
| 5,560,024 * | 9/1996 | Harper et al. . |
| 5,584,031 | 12/1996 | Burch et al. ....................... 395/750 |
| 5,732,255 * | 3/1998 | Verbauwhede . |
| 5,765,013 * | 6/1998 | Jang et al. . |
| 5,802,332 * | 9/1998 | Yokouchi . |
| 5,881,016 * | 3/1999 | Kenkare et al. . |
| 5,887,179 * | 3/1999 | Halahmi et al. . |
| 5,991,884 * | 11/1999 | Lin et al. . |

* cited by examiner

Primary Examiner—Gopal C. Ray
(74) Attorney, Agent, or Firm—Robert D. Marshall, Jr.; W. James Brady, III; Frederick J. Telecky, Jr.

(57) ABSTRACT

A method of optimizing a computer program for reduced power consumption by a processor (10) having functional units (11d, 11e) that are independently controllable by instructions. The processor's instruction set (FIG. 4) has instructions that may be directed to a particular functional unit (11d, 11e) so as to place that functional unit in a power-down state while not being used during a program segment.

9 Claims, 4 Drawing Sheets

FIG. 3

| PARALLEL DESIGNATOR (P-BIT) | CONDITIONAL REGISTER FIELD | INSTRUCTION TYPE | FUNCTIONAL UNIT | OPERAND FIELD |
|---|---|---|---|---|
| \|\| | [A2] | ADD | .L1 | A9, A10, A10 |
| \|\| |  | ADD | .L2 | B12, B11, B12 |
| \|\| |  | MPYHL | .M1 | A8, A5, A9 |
| \|\| |  | MPYH | .M2X | A8, B6, B7 |
| \|\| |  | LDW | .D1 | *A0++[2], A5 |
| \|\| |  | LDW | .D2 | *B3++[2], B6 |
| \|\| | [B2] | ADD | .S1 | A2, 1, A2 |
| \|\| |  | NOP | .S2 |  |

OPFIELD
20

FIG. 4A

| .L Unit | .M Unit | .S Unit | .D Unit |
|---|---|---|---|
| ABS | MPY | ADD | ADD |
| ADD | SMPY | ADDK | ADDA |
| AND |  | ADD2 | LD mem |
| CMPEQ |  | AND |  |
| CMPGT |  | B disp | MV |
| CMPGTU |  | B IRP | NEG |
| CMPLT |  | B NRP | ST mem |
| CMPLTU |  | B reg |  |
| LMBD |  | CLR | SUB |
| MV |  | EXT | SUBA |
| NEG |  | EXTU | ZERO |
| NORM |  | MVC |  |
| NOT |  | MV |  |
| OR |  | MVK |  |
| SADD |  | MVKH |  |
| SAT |  | NEG |  |
| SSUB |  | NOT |  |
| SUB |  | OR |  |
| SUBC |  | SET |  |
| XOR |  | SHL |  |
| ZERO |  | SHR |  |
|  |  | SHRU |  |
|  |  | SSHL |  |
|  |  | SUB |  |
|  |  | SUB2 |  |
|  |  | XOR |  |
|  |  | ZERO |  |
| SLEEP | SLEEP | SLEEP | SLEEP |

FIG. 4B

| ARITHMATIC | MULTIPLY | LOAD/STORE | PROGRAM CONTROL |
|---|---|---|---|
| ABS<br>  absolute value<br>ADD<br>ADDA<br>ADDK<br>ADDZ<br>SADD<br>  addition<br>SAT<br>  saturate<br>SSUB<br>SUB<br>SUBA<br>SUBC<br>SUBB<br>  subtraction | MPY<br>MPYH<br>MPYHL<br>MPYLH<br>SMPY<br>  multiply | LD<br>  load<br>MVK<br>MVKH<br>  move<br>ST<br>  store | B<br>BIRP<br>BNRP<br>  branch |

| BIT MANAGEMENT | LOGICAL | PSUEDO/OTHER |
|---|---|---|
| CLR<br>  clear<br>EXT<br>  extract<br>LMBD<br>  leftmost bit detection<br>NORM<br>  normalize<br>SET | AND<br>CMPEQ<br>CMPBT<br>CMPLT<br>  compare<br>OR<br>SHL<br>SHR<br>  shift<br>SSHL<br>  shift w/ saturation<br>XOR | IDLE<br>MV<br>MVC<br>  move<br>NOP<br>ZERO<br>NEG<br>NOT |

FIG. 6

| | DATA PATH 1 | DATA PATH 2 | PERIPHERAL 1 |
|---|---|---|---|
| ACTIVE INSTRUCTIONS | •<br>•<br>•<br>•<br>• | •<br>•<br>• | • |
| | SLEEP<br>REST | SLEEP<br>REST | SLEEP<br>REST |

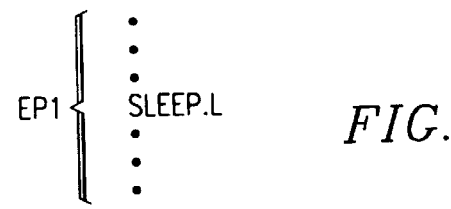
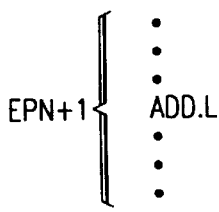
FIG. 5
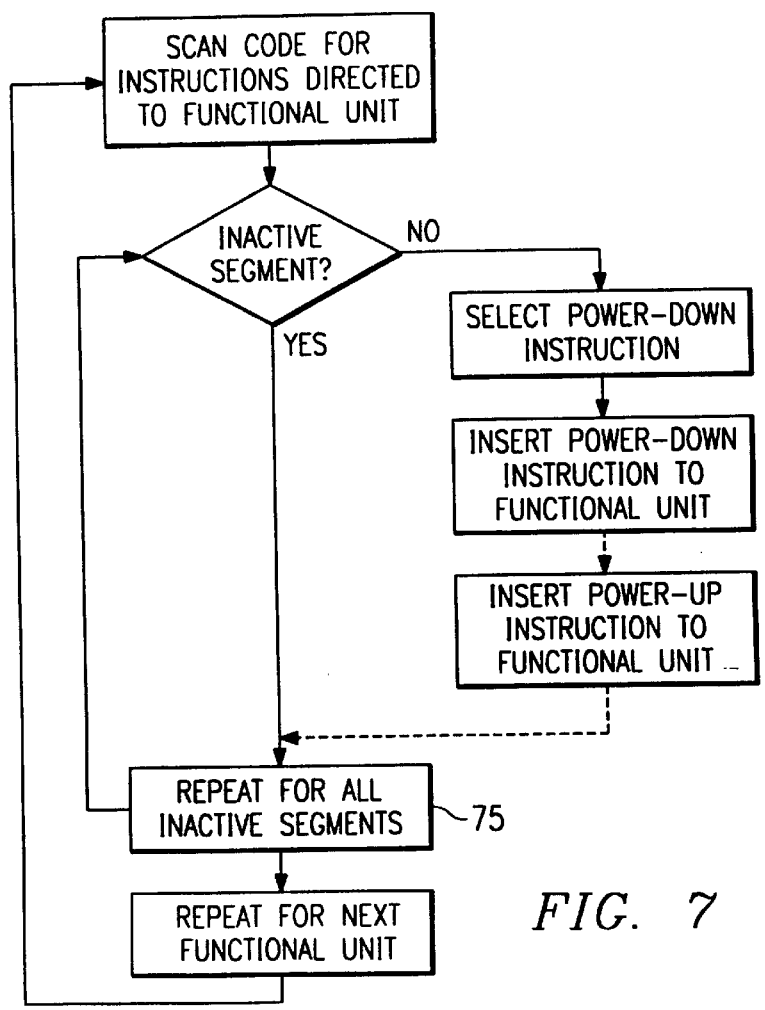
FIG. 7

POWER REDUCTION FOR PROCESSORS BY SOFTWARE CONTROL OF FUNCTIONAL UNITS

This application claims priority under 35 USC §119(e)(1) of Provisional Application No. 60/068,646, filed Dec. 23, 1997.

TECHNICAL FIELD OF THE INVENTION

This invention relates to microprocessors, and more particularly to methods of using programming instructions in a manner that reduces the power consumption of a microprocessor.

BACKGROUND OF THE INVENTION

Power efficiency for processor-based equipment is becoming increasingly important as people are becoming more attuned to energy conservation issues. Specific considerations are the reduction of thermal effects and operating costs. Also, apart from energy conservation, power efficiency is a concern for battery-operated processor-based equipment, where it is desired to minimize battery size so that the equipment can be made small and lightweight. The "processor-based equipment" can be either equipment designed especially for general computing or equipment having an embedded processor.

For the standpoint of processor design, a number of techniques have been used to reduce power usage. These techniques can be grouped as two basic strategies. First, the processor's circuitry can be designed to use less power. Second, the processor can be designed in a manner that permits power usage to be managed.

In the past, power management has been primarily at the system level. Various "power down" modes have been implemented, which permit parts of the system, such as a disk drive, display, or the processor itself to be intermittently powered down.

The entry of a device into a power down mode can be initiated in various ways, such as in response to a timer or in response to an instruction from the processor. In the case of the former, the timer automatically shifts the device into a power down mode after it has been inactive for a preset period. In the case of the latter, i.e., instruction-implemented power management, various standards have been developed to place power management under processor control. One such standard is the Advanced Power Management interface specification, developed jointly by Intel and Microsoft.

One approach to processor power management is described in U.S. Pat. No. 5,584,031, entitled "System and Method for Executing a Low Power Delay Instruction". A special instruction (a "sleep" opcode) specifies a number of timing cycles during which activity of the central processing unit is delayed.

Another approach to processor power management is described in U.S. Pat. No. 5,495,617, entitled "On Demand Powering of Necessary Portions of Execution Unit by Decoding Instruction Word Field Indications Which Unit is Required for Execution". An instruction decoder differentiates "control" instructions from "execute" instructions. If the instruction is a "control" instruction, it does not involve the execution unit, and a standby signal can be sent to the execution unit.

SUMMARY OF THE INVENTION

One aspect of the invention is a method of optimizing a computer program for reduced power consumption. The method is used with programs written for a processor having distinct "functional units" to which instructions may be independently directed. The processor's instruction set is modified so as to provide special "power-down" instructions that may be directed to one or more functional units independently of other functional units. Then, for each functional unit, the computer program is scanned to locate segments of the program where that functional unit is not used. Based on the results of the scanning step, power-down instructions are inserted into the program, such that the functional unit uses less power while not in use. The method can be performed manually by an assembly language programmer or by a code optimization program.

An advantage of the invention is that it provides power management at an "on-chip" level, as compared to a computer system level. The level of power management is "fine-grained", being directed to components within the processor. Power management can be directed even to functional units within the processor's CPU.

A further advantage is that when a power-down instruction is used in accordance with the invention, the rest of the processor is fully operational. The program continues to execute as if the instructions were not there, because only functional units that are not used are affected. Thus, when inserted into a particular application program, the power-down instructions operate transparently to the programming in terms of both function and execution time.

Selective power management of functional units within a processor facilitates the use of specialized on-chip circuitry. Examples are circuits for performing special functions such as floating point operations, Fourier transforms, and digital signal filtering. Such circuits can be included on-chip and only consume power when used. Thus, in today's manufacturing environment, where such circuits are less and less expensive to include on-chip, power consumption need not be a drawback to including them.

BRIEF DESCRIPTION OF THE DRAWINGS

FIG. 3 is an example of a fetch packet.

FIG. 4A illustrates one embodiment of an instruction set of the processor of FIG. 1.

FIG. 4B is a table describing the mnemonics of FIG. 4A.

FIG. 5 illustrates an example of a program code segment having a power-down instruction in accordance with the invention.

FIG. 6 illustrates another embodiment of an instruction set of the processor of FIG. 1.

FIG. 7 illustrates a method of optimizing a computer program to reduce power consumption in accordance with the invention.

DETAILED DESCRIPTION OF THE INVENTION

The invention described herein is directed to power management for microprocessors. The processor's instruction set is designed in a manner that permits the programmer (or compiler) to generate code that will be efficient in terms of power usage. Special power-down instructions control the power consumption of circuits internal to the processor.

The method of the invention can be applied to any type of processor, provided that its instruction set has, or is amenable to, the type of instructions described herein. The common characteristic of any processor with which the invention is useful is that it has more than one functional unit, whose activity can be independently controlled by instruction. In other words, an instruction may be selectively directed to a functional unit.

These "functional units" are described herein so as to comprise components within the processor's central processing unit, such as separate datapaths or circuits within separate datapaths. Additionally, as described below, the functional units may comprise components within the processor but peripheral to its central processing unit, such as memory devices or specialized processing units.

Thus, the method of the invention is useful with VLIW (very long instruction word) processors, which are characterized by their use of different functional units to execute instructions in parallel. The invention is also useful with "dual datapath" processors, which use two datapaths to execute instructions in parallel. Both types of processors are characterized by having more than one functional unit that operate in parallel (or substantially in parallel). However, the invention is also useful with processors having functional units that do not operate in parallel but that are "independently instructable" as described in the preceding paragraph. In fact, the invention is most useful in the latter case, where the serial operation of functional units makes it more likely that a particular functional unit will not be used during execution of a program.

In light of the preceding paragraph, the term "processor" as used herein may include various types of micro controllers and digital signal processors (DSPs), as well as general purpose computer processors. The following description is in terms of DSPs—the TMS320 family of DSPs and a modification of the TMS320C6x DSP in particular. However, this selection of a particular processor is for purposes of description and example only.

Processor Overview

Figure 1:
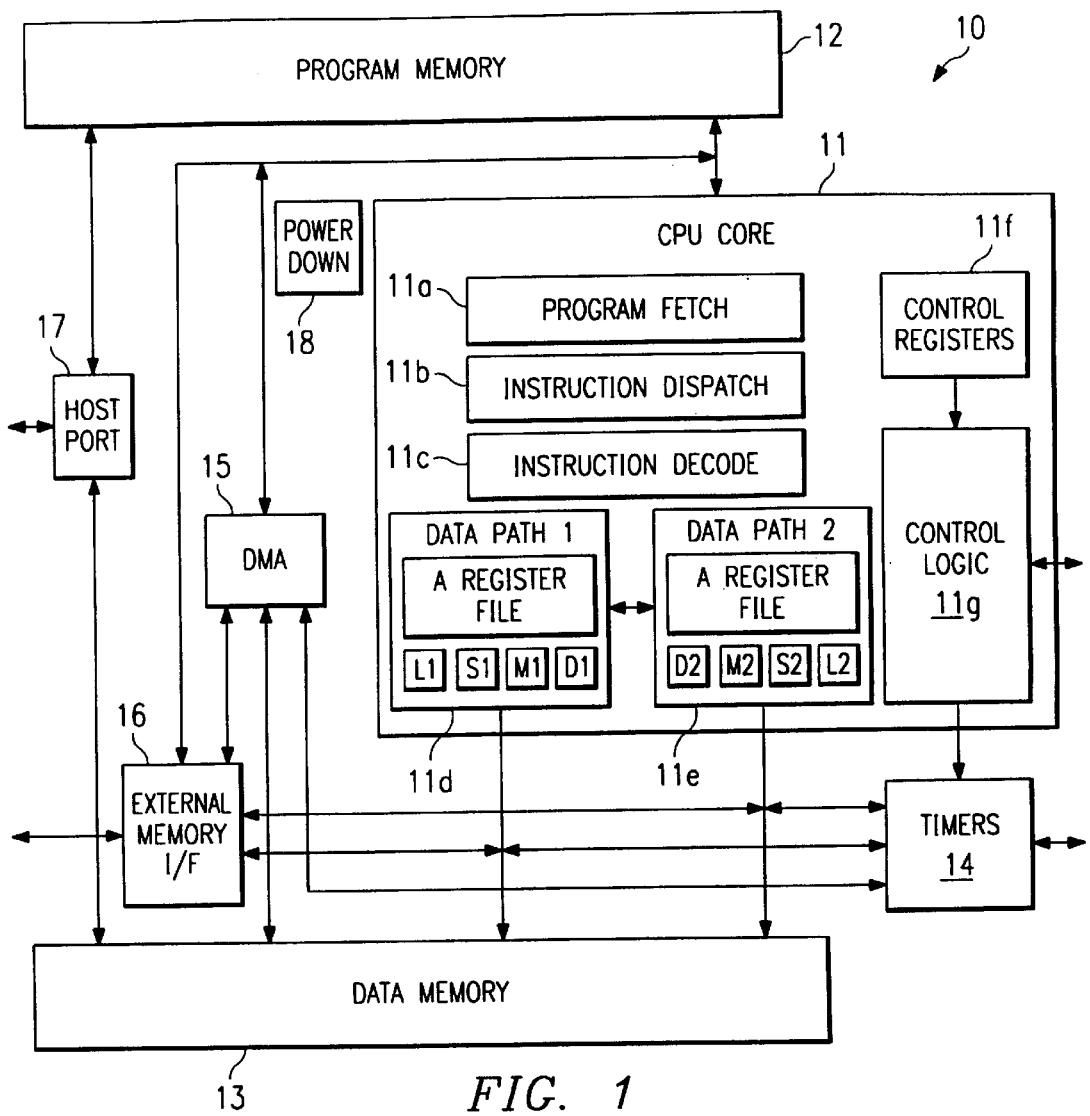
FIG. 1 is a block diagram of an example processor, which has functional units to which instructions may be independently directed in accordance with the invention.

FIG. 1 is a block diagram of a DSP processor 10. As explained below, processor 10 has a VLIW architecture, and fetches multiple-instruction words (as "fetch packets") to be executed in parallel (as "execute packets") during a single CPU clock cycle. In the example of this description, processor 10 operates at a 5 nanosecond CPU cycle time and executes up to eight instructions every cycle.

Processor 10 has a CPU core 11, which has a program fetch unit 11a, and instruction dispatch and decode units 11b and 11c, respectively. To execute the decoded instructions, processor 10 has two datapaths 11d and 11e.

Instruction decode unit 11c delivers execute packets having up to eight instructions to the datapath units 11d and 11e every clock cycle. Datapaths 11d and 11e each include 16 general-purpose registers. Datapaths 11d and 11e each also include four functional units (L, S, M, and D), which are connected to the respective 16 general-purpose registers. Thus, processor 10 has eight functional units, each of which may execute one of the instructions in an execute packet. Each functional unit has a set of instruction types that it is capable of executing.

The control registers 11f provide the means to configure and control various processor operations. The control logic unit 11g has logic for control, test, emulation, and interrupt functions.

Processor 10 also comprises program memory 12, data memory 13, and timers 14. Its peripheral circuitry includes a direct memory access (DMA) controller 15, external memory interface 16, host port 17, and power down logic 18. The power down logic 18 can halt CPU activity to reduce power consumption. There is more than one power-down mode, which vary by what clocks are still active in the CPU. These power-down modes, as well as features of processor 10 other than the features of the present invention, are described in U.S. Provisional Application No. 60/046,811, to L. Hurd, entitled "Module-Configurable, Full-Chip Power Profiler" filed May 2, 1997 now abandoned, serving a priority to U.S. patent applicaton Ser. No. 09/066,620 filed Apr. 24, 1998, assigned to Texas Instruments Incorporated and incorporated herein by reference.

Processor 10 executes RISC-like code, and has an assembly language instruction set. In other words, each of its VLIWs comprises RISC-type instructions. A program written with these instructions is converted to machine code by an assembler, or a higher-level program is converted to machine code by a compiler. Processor 10 does not use microcode or an internal microcode interpreter, as do some other processors. However, the invention described herein could be applicable regardless of whether RISC-like instructions control the processor or whether instructions are internally interpreted to a lower level.

In the example of this description, eight 32-bit instructions are combined to make the VLIW fetch packet. Thus, in operation, 32-bit instructions are fetched eight at a time from program memory 12, to make a 256-bit instruction word.

Figure 2:
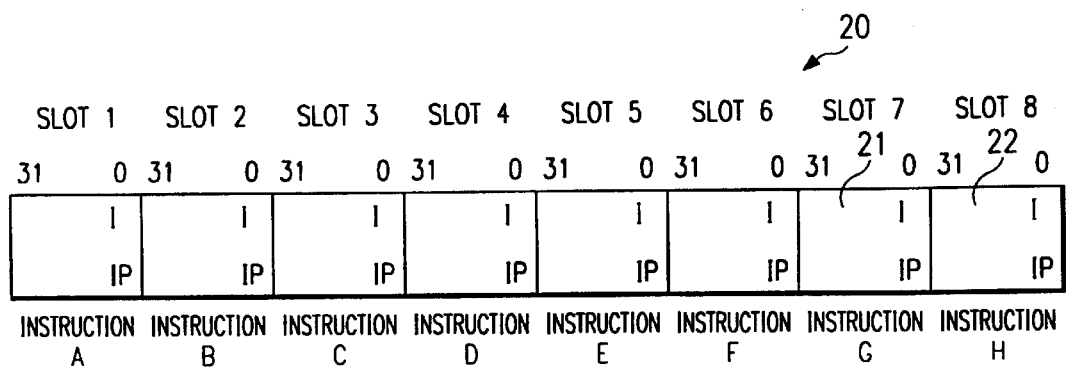
FIG. 2 illustrates the format of a fetch packet used by the processor of FIG. 1.

FIG. 2 illustrates the basic format of the fetch packet 20 used by processor 10. Each of the eight instructions in fetch packet 20 is placed in a location referred to as a "slot" 21. Thus, fetch packet 20 has Slots 1, 2, . . . 8.

Processor 10 differs from other VLIW processors in that the entire fetch packet is not necessarily executed in one CPU cycle. All or part of a fetch packet is executed as an "execute packet". In other words, a fetch packet can be fully parallel, fully serial, or partially serial. In the case of a fully or partially serial fetch packet, where the fetch packet's instructions require more than one cycle to execute, the next fetch can be postponed. This distinction between fetch packets and execute packets permits every fetch packet to contain eight instructions, without regard to whether they are all to be executed in parallel.

For processor 10, the execution grouping of a fetch packet 20 is specified by a "p-bit" 22 in each instruction. In operation, instruction dispatch unit 11b scans the p-bits, and the state of the p-bit of each instruction determines whether the next instruction will be executed in parallel with that instruction. If so, it places the two instructions in the same execute packet to be executed in the same cycle.

FIG. 3 illustrates an example of a fetch packet 20. Whereas FIG. 2 illustrates the format for the fetch packet 20, FIG. 3 illustrates an example of instructions that a fetch packet 20 might contain. Each of the eight instructions has a number of fields, which ultimately are expressed in bit-level machine code. The NOP (no operation) instruction is a placeholder and has no execution associated with it.

The || characters signify that an instruction is to execute in parallel with the previous instruction, and is coded as p-bit 22. As indicated, fetch packet 20 is fully parallel, and may be executed as a single execute packet.

The square brackets [ ] signify a conditional instruction, surrounding the identifier of a condition register. Thus, the first instruction in FIG. 3 is conditioned on register A2 being nonzero. A ! character signifies "not", so that a condition on A2 being zero would be expressed as [!A2]. The conditional register field comprises these identifiers.

The opfield contains an instruction type from the instruction set of processor 10. Following the instruction type is the designation of the functional unit that will execute the instruction. As stated above in connection with FIG. 1, each of the two datapaths 11d and 11e has four functional units. These functional units are L (logical), S (shift), M (multiply), and D (data). The opfield thus has the syntax [instruction type]. [functional unit identifier].

Some instruction types can be performed by only one functional unit and some can be performed by one of a number of them. For example, only the M unit can perform a multiply (MPY). On the other hand, an add (ADD) can be performed by the L, S, or D unit. The correspondence of functional units to instructions is referred to herein as their "mapping".

FIG. 4A is a table illustrating, for processor 10, the mapping of instruction types to functional units. FIG. 4B is a table describing the mnemonics of FIG. 4A.

The mapping of functional units to instruction types determines which instructions can be executed in parallel, and therefore whether a fetch packet will become more than one execute packet. For example, if only the M unit can perform a multiply (MPY), an execute packet could have two MPY instructions, one to be executed by each of the two datapaths 11d and 11e. In contrast, the L, S, and D units are all capable of executing an add (ADD), thus an execute packet could contain as many as six ADD instructions.

Referring again to FIG. 3, the instruction's operand field follows the opfield. Depending on the instruction type, the operand field may identify one or more source registers, one or more constants, and a destination register.

To generalize the above-described processor architecture, an executable instruction word, i.e., an execute packet, contains up to eight instructions to be executed in parallel during a CPU cycle. Each instruction in an execute packet uses a different one of the functional units (L, D, S or M) of datapaths 11d and 11e. The instruction mapping determines the functional unit(s) to which an instruction may be directed. The ability to independently instruct functional units in this manner lends itself to unique techniques for power optimization. As explained below, power-down instructions can be used, so that the power consumption of functional units is independently controlled.

Selective Power Control of Functional Units Referring again to FIG. 4, the instruction set of processor 10 is comprised of a number of instruction types, each of which may be executed by one or more functional units. These functional units are illustrated in FIG. 1, as the L, D, M, and S units of datapaths 11d and 11e.

The SLEEP instruction type is for "power-down" instructions. It may be used with any of the functional units, M, S, D, and L. The instruction types other than SLEEP are referred to herein as "active" instructions.

During execution of a program, while a functional unit is not executing active instructions, it may be given the SLEEP instruction. Using the instruction format described above in connection with FIG. 2, the instruction has the following opfield:

SLEEP. [identifier of functional unit]
Only the specified functional unit is affected by the instruction; each other remains in its ready state unless otherwise instructed by its own power-modifying instruction. In the above example, each opfield controls a single functional unit. However, instruction types could also be provided that control more than one functional unit, such as SLEEPx,x,x, ..., where the x's specify which functional unit(s) are to be affected. In the example of this description, the x's could be M,L,S, or D. Thus, a power-down instruction for functional units M and L would be SLEEPML.

As described above, reducing the readiness of a functional unit is done explicitly. A power-down instruction is placed in the program code at a point where the functional unit enters a period of non-use.

Restoring the functional unit to a state of readiness could be explicit or implicit. In the case of explicit restoration, a "power-up" instruction could be a new instruction type, such as "WAKE", or a toggle of the power-down instruction. For a toggle, the same instruction encountered a first time would reduce readiness and encountered a second time would restore readiness. In the case of implicit restoration, an "executable" instruction (an instruction other than SLEEP) to a functional unit that has previously received a power-down instruction could automatically result in restoration of its readiness.

A set of functional units whose readiness is reduced by one instruction could be separately restored at different times. For example, two functional units, M and D, might be given the SLEEP instruction at the same point in a program, but their readiness can be restored at different times by separate instructions.

FIG. 5 illustrates a segment of program code where a functional unit, L, is not used for active instructions during a number of execute cycles. These execute cycles are represented by execute packets EP1 ... EPN. A power-down instruction directed to that functional unit, SLEEP.L, is inserted in execute packet EP1. The restoration of L to a ready state is implicit, by the next active instruction directed to it, an ADD.

Selective Power Control of Other Functional Units

As described above, the architecture of processor 10 lends itself to power-down instructions directed to functional units within datapaths 11d and 11e. In alternative embodiments, the power-down instructions could be directed to the datapaths 11d and 11e as whole functional units, rather than to their internal functional units.

Also, the same concepts can be applied to power control of other functional units within processor 10. For example, within CPU 11, subsets of the control registers 11f could be selected for power modification when not used. Other components suitable for power modification are specialized execution units such as floating point units and FFT units (not shown). Also, portions of memory 12 or memory 13 could similarly powered down. In general, the invention applies to the selective power-modification of any "functional unit" within processor 10, where the functional unit may either directly execute instructions or serve some peripheral function, and regardless of whether it is internal or external to the central processing unit 11.

FIG. 6 illustrates an example of instruction-mapping for power-down instructions directed to datapaths 11d and 11e within CPU 11, as well as to peripheral components within processor 10 but outside CPU 11. For example, the peripheral unit might be the external memory interface 16. A SLEEP instruction type may be directed to any one of these functional units.

As further illustrated in FIG. 6, one or more additional instruction types may be added to place functional units into intermediate power-down levels. In a "less ready" state, a functional unit would consume less or no power. In a "more ready" state, it would consume more power but could be more quickly be made ready for use. For example, in addition to the SLEEP instruction type, the instruction set of processor 10 has a REST instruction type. An example of implementation of an intermediate power-down instruction is one that turns off all circuitry of a functional unit other than memory that is private to that functional unit.

Intermediate power-down levels are especially useful to avoid delays in restoring power. In other words, after a full power-down instruction, a power-up instruction or a non-power down instruction might result in a delay that would not occur if an intermediate power-down instruction had been used.

Power Optimizing Compiler

FIG. 7 illustrates the basic steps of an optimization process in accordance with the invention. As illustrated, for each functional unit, the program code is scanned to identify segments where the functional unit is not used. The identification of an "inactive segment" made in terms of efficiency. Various power modeling techniques can be used to determine the length of time during which it is more efficient to turn a component off (or partially off) then on again versus leaving it on. The resulting "power down threshold" might be different for different functional units and for different power-down levels.

After an inactive segment is identified, depending on factors such as the length of the segment, an appropriate power-down instruction is selected. For example, a long segment might call for a full power-down instruction whereas a shorter segment might call for an intermediate power down instruction. The power-down instruction is inserted at the beginning of the segment. Depending on the processor architecture, a power-up instruction may or may not be used. The process is repeated for each functional unit.

One approach to implementing the method of FIG. 7 is for a programmer to manually scan the code and insert power-down instructions during the programming process. Alternatively, the method could be performed automatically by a compiler or assembler. A compiler would have the overall function of operating on a higher-level language to create power-efficient machine code for processor 10. An assembler would operate on assembly code.

In the case of either a compiler or assembler, an optimizing process finds, for each functional unit, program segments during which the functional unit is not used are located. These segments would be of longer duration than some predetermined threshold. Once these segments are found, the compiler then inserts a power-modifying instruction at the point in the code when the functional unit first goes out of use.

Locating program segments during which a functional unit is not used may be done by either static or dynamic program analysis. For static analysis, the compiler estimates the number of execute cycles between start and stop points, which may include an estimation of loop cycles and other statistical predictions. Dynamic analysis is performed after the code is in an executable form, such that the compiler may run the code and actually measure time.

In either case, the compiler locates program segments of functional unit non-use. Then, the compiler inserts a power-modification instruction in the code. If there are different levels of power modification, the compiler compares the period of non-use with the thresholds of the various power-modifying instructions, and inserts the appropriate instruction.

Other Embodiments

Although the present invention has been described in detail, it should be understood that various changes, substitutions, and alterations can be made hereto without departing from the spirit and scope of the invention as defined by the appended claims.

What is claimed is:

1. A method of optimizing a computer program for reduced power consumption, where the program is written for a processor having distinct functional units, comprising the steps of:

during program production prior to completion of said computer program identifying at least one segment of said computer program in which at least one functional unit is not used; and based on the results of said identifying step, inserting a power-down instruction at the beginning of said segment;

wherein said power-down instruction is operable to cause said at least one functional unit to use less power during execution of said segment.

2. The method of claim 1, wherein said identifying step is accomplished by statically estimating processor cycles prior to running said computer program.

3. The method of claim 1, further comprising the step of during program production prior to completion of said computer program inserting a power-up instruction in said computer program, wherein said power-up instruction directed to said at least one functional unit is operable to restore said at least one functional unit to a ready state.

4. The method of claim 1, wherein said power-down instruction includes a first power-down instruction operable to reduce power to all of said at least one functional unit, such that said functional unit is placed in a low state of readiness and a second power-down instruction operable to reduce power to only a part of said at least one functional unit, such that said functional unit is placed in an intermediate state of readiness.

5. The method of claim 1, wherein said identifying step is accomplished by comparing the duration of said segment with a predetermined threshold.

6. The method of claim 1, wherein said power-down instruction has a format including a first portion identifying said instruction as a power-down instruction and a second portion indicating the identity of a single functional unit.

7. The method of claim 1, wherein said power-down instruction has a format including a first portion identifying said instruction as a power-down instruction and a second portion indicating the identity of a number of functional units.

8. The method of claim 1, wherein:

said power-down instruction includes
  a first power-down instruction operable to reduce power of said at least one functional unit to a first low state and place that said functional unit in a low state of readiness, and
  a second power-down instruction operable to reduce power of said at least one functional unit to a second low state greater than said first low state but less than a ready state and place said functional unit in an intermediate state of readiness greater than said low state of readiness;

said identifying step includes comparing the duration of said segment with a first predetermined threshold and second predetermined threshold shorter than said first predetermined threshold; and said inserting step
  inserts said first power-down instruction if said segment has a duration longer than said first predetermined threshold, and
  inserts said second power-down instruction if said segment has a duration longer than said second predetermined threshold and less than said first predetermined threshold.

9. A method of optimizing a computer program for reduced power consumption, where the program is written for a processor having distinct functional units, comprising the steps of:

during program production prior to completion of said computer program identifying at least one segment of said computer program in which at least one functional unit is not used; and based on the results of said identifying step, inserting a first power-control instruction at the beginning of said segment and a second power-control instruction before the end of said segment;

wherein said power-control instruction is operable to cause said at least one functional unit to toggle between a full power ready state and a power-down state wherein said at least one functional unit consumes less power than in said ready state.

* * * * *